(12) United States Patent
Abu-Isa

(10) Patent No.: US 6,589,620 B1
(45) Date of Patent: *Jul. 8, 2003

(54) FUEL PERMEATION RESISTANT FUEL TANK

(75) Inventor: Ismat Ali Abu-Isa, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 144 days.

This patent is subject to a terminal disclaimer.

(21) Appl. No.: 09/650,590

(22) Filed: Aug. 30, 2000

Related U.S. Application Data
(60) Provisional application No. 60/172,557, filed on Dec. 18, 1999.

(51) Int. Cl.[7] .......................... B29D 22/00; B29D 23/00; B32B 1/08; B60P 3/00; B62D 33/00
(52) U.S. Cl. ...................... 428/36.6; 428/35.7; 428/421; 428/422; 220/562
(58) Field of Search .................. 428/35.7, 35.9, 428/36.6, 36.91, 421, 422; 220/562, 415, 456, 457; 206/524.1, 524.2, 524.3, 524.5

(56) References Cited

U.S. PATENT DOCUMENTS

| 5,441,781 A | * | 8/1995 | Uchida et al. | ............. | 428/35.7 |
| 6,033,749 A | * | 3/2000 | Hata et al. | ................. | 428/36.7 |

* cited by examiner

*Primary Examiner*—Harold Pyon
*Assistant Examiner*—Michael C. Miggins
(74) *Attorney, Agent, or Firm*—Vincent A. Cichosz

(57) ABSTRACT

A fuel permeation resistant fuel tank for a vehicle includes a tank shell having a wall formed from a plurality of layers. The layers include at least an inner layer, an outer layer and a fuel permeation barrier layer disposed between the inner layer and the outer layer and being made of a liquid crystalline polymer (LCP) material.

22 Claims, 2 Drawing Sheets

| PERMEABILITY CONSTANT, EQUILLIBRIUM FUEL UPTAKE, AND MECHANICAL PROPERTIES OF HDPE, EVOH, & LIQUID CRYSTALLINE POLYMER (LCP) BEFORE & AFTER EXPOSURE TO FUELS AT 40°C | | | |
|---|---|---|---|
| TEST CONDITION | HDPE | POLYMER EVOH | LCP |
| PERMEABILITY CONSTANT (GRAM-MIL/100 SQUARE INCH-DAY) IN | | | |
| FUEL C | 180 | 0.006 | 0.022 |
| 85/15 FUEL C/METHANOL | 160 | 22 | 0.41 |
| 15/85 FUEL C/METHANOL | 15 | 52 | 0.65 |
| EQUILIBRIUM UPTAKE (WEIGHT) | | | |
| FUEL C | 8.0 | 0.3 | 0.3 |
| 85/15 FUEL C/METHANOL | 7.0 | 9.8 | 9.8 |
| TENSILE MODULUS (kPSI) | | | |
| AS RECEIVED | 64 | 360 | 0.3 |
| AFTER SOAK IN FUEL C | 41 | 305 | 0.3 |
| AFTER SOAK IN 85/15 FUEL C/METHANOL | 40 | 47 | 2276 |
| YEILD STRESS (PSI) | | | |
| AS RECEIVED | 3485 | 12018 | 63356 |
| AFTESOAK IN FUEL C | 2580 | 10601 | 68984 |
| AFTER SOAK IN 85/15 FUEL C/METHANOL | 2720 | 3184 | 68674 |

FIG. 3

FUEL PERMEATION RESISTANT FUEL TANK

CROSS-REFERENCE TO RELATED APPLICATION(S)

The present invention claims the priority date of copending U.S. Provisional Patent Application Serial No. 60/172,557, filed Dec. 18, 1999.

TECHNICAL FIELD

The present invention relates generally to fuel tanks for vehicles and, more particularly, to a fuel permeation resistant fuel tank for a vehicle.

BACKGROUND OF THE INVENTION

It is known to provide a fuel tank such as a plastic fuel tank in a vehicle to hold fuel to be used by an engine of the vehicle. In some vehicles, the plastic fuel tank has a fuel permeation barrier made of an ethylene vinyl alcohol copolymer (EVOH). While EVOH is effective against permeation of pure hydrocarbon fuels, it has a high permeability when used with alcohol containing fuels.

One commercial approach to resolve this concern regarding permeation is to thicken the walls of the fuel tank, which increases the weight, cost and reduces fuel capacity of the fuel tank. Therefore, it is desirable to provide a fuel tank for a vehicle that has a more effective fuel permeation barrier to prevent evaporative emission. It is also desirable to provide a fuel permeation resistant fuel tank for a vehicle that significantly reduces evaporative emissions.

SUMMARY OF THE INVENTION

It is, therefore, one object of the present invention to provide a new fuel permeation resistant fuel tank for a vehicle.

It is another object of the present invention to provide a fuel tank that significantly reduces evaporative emissions in comparison to EVOH plastic tanks.

To achieve the foregoing objects, the present invention is a fuel permeation resistant fuel tank for a vehicle including a tank shell having a wall formed from a plurality of layers. The layers include at least an inner layer, an outer layer and a fuel permeation barrier layer between the inner layer and the outer layer and being made of a liquid crystalline polymer (LCP) material.

One advantage of the present invention is that a fuel permeation resistant fuel tank is provided for a vehicle that has a more effective fuel permeation barrier leading to less evaporative emissions. Another advantage of the present invention is that the fuel permeation resistant fuel tank uses liquid crystalline polymer (LCP) as the material for the barrier layer. Yet another advantage of the present invention is that the LCP adds high strength and stiffness to the fuel tank and is a good candidate for high pressure fuel vessels as compared to EVOH. Still another advantage of the present invention is that the fuel permeation resistant fuel tank uses LCP as the barrier layer, which has low permeation to fuels and very high modulus and strength. A further advantage of the present invention is that the use of these materials in a plastic fuel tank leads to a lighter tank.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3 is a table of material properties before and after exposure to fuels at 40° C.

DESCRIPTION OF THE PREFERRED EMBODIMENT

Figure 1:
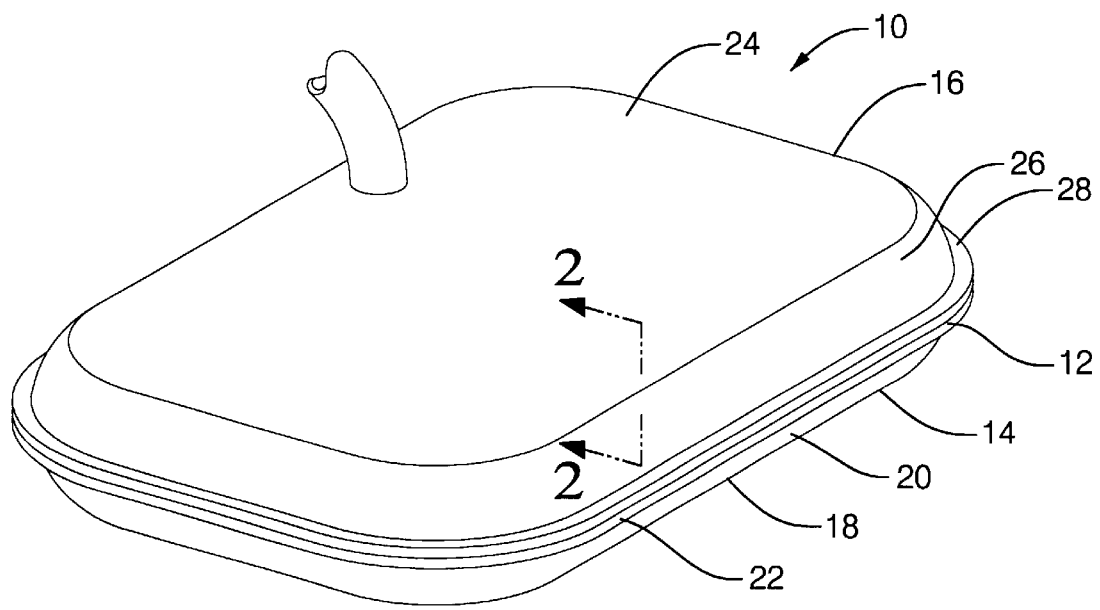
FIG. 1 is a perspective view of a fuel permeation resistant fuel tank, according to the present invention.
Figure 2:
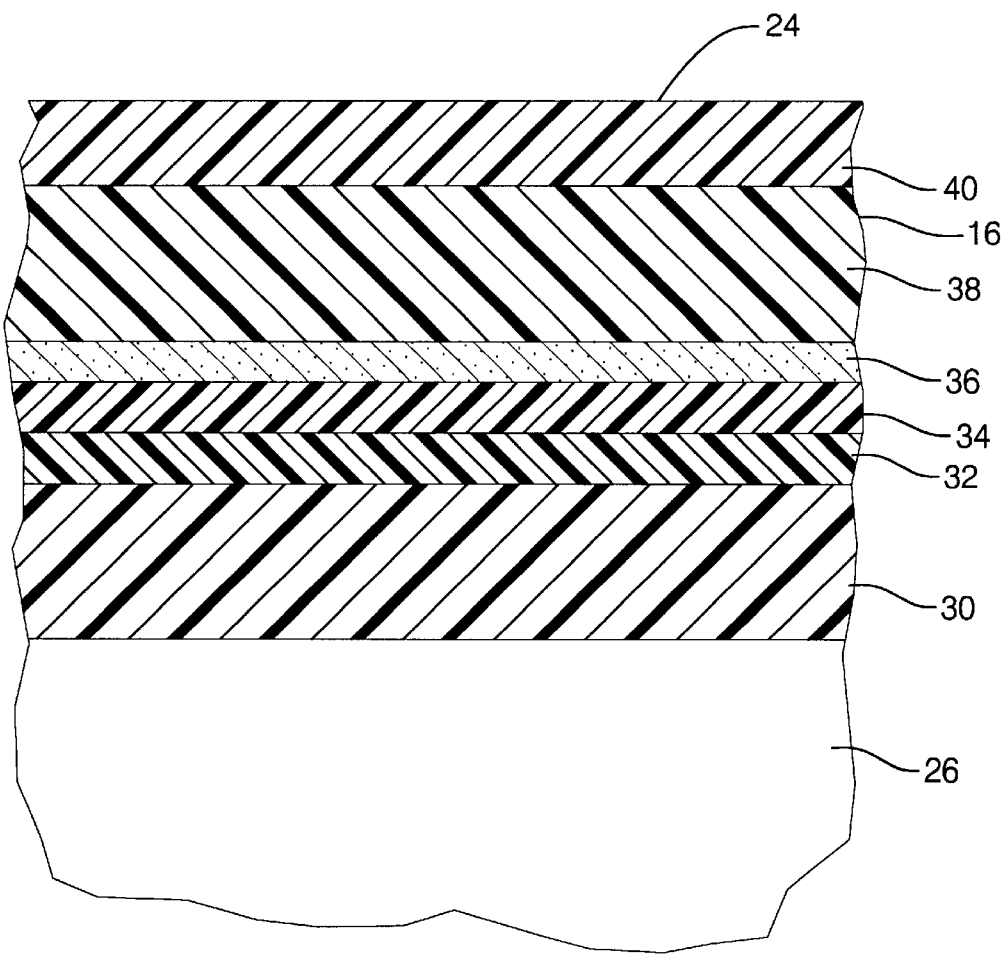
FIG. 2 is a sectional view taken along line 2—2 of FIG. 1.

Referring to the drawings and in particular FIGS. 1 and 2, one embodiment of a fuel permeation resistant fuel tank 10, according to the present invention, is shown for a vehicle (not shown). The fuel permeation resistant fuel tank 10 includes a tank shell 12. In the embodiment illustrated, the tank shell 12 is of a generally rectangular type. The tank shell 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together to form a seam by suitable means such as by thermoforming, compression molding or friction welding. The lower half shell 14 and upper half shell 16 are made of a rigid material such as a thermoformable plastic.

Referring to FIGS. 1 and 2, the fuel permeation resistant fuel tank 10 has the base walls 18,24, side walls 20,26, and flanges 22,28 formed from a plurality of layers 30,32,34, 36,38,40. The first or inner layer 30 is made from a thermoformable polymer such as a high density polyethylene (HDPE), which is a conventional material known in the art. The first layer 30 has a predetermined thickness of approximately two millimeters (2.00 mm). The first layer 30 also has a predetermined percentage of the material weight such as approximately 42%.

The second layer 32 is made from an adhesive such as maleated polyethylene (ADMER Grade GT6A), which is a conventional material known in the art. The second layer 32 has a predetermined thickness of approximately 0.07 mm. The second layer 32 also has a predetermined percentage of the material weight such as approximately 1.5%.

The third layer 34 is a barrier layer made from a liquid crystalline polymer (LCP). LCPs are thermoplastics that have rod like molecular structures. More specifically, LCPs are aromatic polymers with amides, imides ethers, or esters functionality such as Vectra LCP resin from Ticona or Celenese, Dupont Zenite resins and Amoco Xyder resins, which are conventional materials known in the art. The LCPs have very high strength and excellent resistance to high temperatures. The LCPs also orient on a molecular level during extrusion or molding or if the material is drawn during blow molding or vacuum forming. The third layer 34 has a predetermined thickness of approximately 0.11 mm. The third layer 34 also has a predetermined percentage of the material weight such as approximately 3.0%.

The fourth layer 36 is made from an adhesive such as maleated polyethylene (ADMER Grade GT6A), which is a conventional material known in the art. The fourth layer 36 has a predetermined thickness of approximately 0.07 mm.

The fourth layer 36 also has a predetermined percentage of the material weight such as approximately 1.5%.

The fifth layer 38 is made from a one hundred percent (100%) regrind of a high density polyethylene (HDPE), which is a conventional material known in the art. The fifth layer 38 has a predetermined thickness of approximately 1.5 mm. The fifth layer 38 also has a predetermined percentage of the material weight such as approximately 32%.

The sixth or outer layer 40 is made from a thermoformable polymer such as a high density polyethylene (HDPE), which is a conventional material known in the art. The sixth layer 40 has a predetermined thickness of approximately one millimeter (1.00 mm). The sixth layer 46 also has a predetermined percentage of the material weight such as approximately 20%. It should be appreciated that the layers 30,32, 34,36,38,40 have a total thickness of approximately 4.75 mm.

In manufacturing the fuel permeation resistant fuel tank 10, several conventional processes may be used. Preferably, the fuel permeation resistant fuel tank 10 is formed by a conventional thermoforming process wherein the layers 30,32,34,36,38,40 can be thermoformed as a co-extruded sheet by heat and pressure. In another embodiment, the fuel permeation resistant fuel tank 10 is formed by a conventional extrusion process wherein the third layer 34 is extruded as a separate layer that can be incorporated into the multi-layer structure. It should be appreciated that another way of taking advantage of the resistance of the third layer 34 to alcohol containing fuels, natural gas or hydrogen is to use them as a second barrier in the fuel tank 12 with EVOH used as the first barrier.

Referring to FIG. 3, a table of permeability constant, equilibrium fuel uptake, and mechanical properties of HDPE, EVOH, and LCP before and after exposure to fuels at 40° C. is shown. The table shows permeation constants and other pertinent properties when HDPE, EVOH and LCP are exposed to various fuels, and compares the effects to those experienced by the barrier material EVOH. The permeability of EVOH to pure hydrocarbon is extremely low. For this fuel, EVOH is one of the most effective barriers. However, when alcohol is introduced into the fuel, the permeability of EVOH is compromised as illustrated in the table. Permeability constant of EVOH in pure gasoline is 0.006 g-mil/100 sq. in-day. In fuels containing 15% and 85% methanol, the permeability constant jumps to 22 and 52 g-mil/100 sq. in-day, respectively. The deterioration in permeation effectiveness is also reflected by the higher equilibrium fuel uptake when EVOH is exposed to the fuels at 40° C. The uptake goes from 0.3% in fuel C to 9.8% in 15/85 methanol/fuel C blend. It should be appreciated that appreciable decreases in modulus and yield strength are also observed.

As illustrated in the table in FIG. 3, the LCPs have low permeation to fuel C (0.022 g-mil/100 sq. in-day), and to methanol containing fuel (0.41 and 0.65 g-mil/100 sq. in-day for 85/15 and 15/85 fuel C/methanol blend, respectively). The LCP's tensile modulus, as received, of 1830 kPSI is five times higher than the EVOH, and 48 times higher after the polymers have been soaked in 85/15 fuel C/methanol. The yield strength of the LCP shows the same superiority over EVOH especially after fuel soak.

In another embodiment, the fuel permeation barrier fuel tank 10 may include a second fuel permeation barrier layer (not shown) disposed between the inner layer 30 and the outer layer 40. The second permeation barrier layer is made of an ethylene vinyl alcohol (EVOH) copolymer material and is disposed between the inner layer 30 and the fuel permeation barrier layer 34.

Accordingly, LCPs are very low permeation materials for preventing permeation of non-polar hydrocarbon fuels and fuels containing polar additives such as methanol for the barrier layer in fuel tanks. The very high modulus and high strength of the LCPs even after exposure to fuels makes the LCPs a candidate for high pressure containers or vessels used for storing gaseous fuels such as hydrogen, natural gas, methane, propane, etc. These LCPs provide excellent permeation resistance to fuels when used in a fuel tank containing pure hydrocarbon fuels and are superior to EVOH in fuels containing alcohol, such as methanol or ethanol.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel permeation resistant fuel tank comprising:
a tank shell having a wall formed from a plurality of layers;
said layers comprising at least an inner layer, an outer layer, a first fuel permeation barrier layer disposed between said inner layer and said outer layer and being made of a liquid crystalline polymer (LCP) material, and a second fuel permeation barrier layer disposed between said inner layer and said outer layer and being made of a material different than said first fuel permeation barrier layer.

2. A fuel permeation resistant fuel tank as set forth in claim 1 wherein said inner layer and said outer layer are made of a polyethylene material.

3. A fuel permeation resistant fuel tank as set forth in claim 2 wherein said LCP material is an aromatic polymer with one of an amide, imide, ether or ester.

4. A fuel permeation resistant fuel tank as set forth in claim 1 including a regrind layer disposed between said inner layer and said outer layer and being made of a regrind material.

5. A fuel permeation resistant fuel tank as set forth in claim 4 wherein said regrind layer material is a polyethylene material.

6. A fuel permeation resistant fuel tank as set forth in claim 4 including a first adhesive layer disposed between said regrind layer and said inner layer.

7. A fuel permeation resistant fuel tank as set forth in claim 6 wherein said first adhesive layer is disposed between said first fuel permeation barrier layer and said inner layer.

8. A fuel permeation resistant fuel tank as set forth in claim 7 including a second adhesive layer disposed between said regrind layer and said first fuel permeation barrier layer.

9. A fuel permeation resistant fuel tank as set forth in claim 1 wherein said inner layer and said outer layer are made of a high density polyethylene material.

10. A fuel permeation resistant fuel tank as set forth in claim 1 wherein said first fuel permeation barrier layer has a weight percent of 3.0 of a total weight of said layers.

11. A fuel permeation resistant fuel tank as set forth in claim 1 wherein said outer layer has a thickness less than said inner layer.

12. A fuel permeation resistant fuel tank comprising:
a tank shell having a wall formed from a plurality of layers;

said layers comprising at least an inner layer and an outer layer; and a first fuel permeation barrier layer disposed between said inner layer and said outer layer and being made of a liquid crystalline polymer (LCP) material comprising an aromatic polymer with one of an amide, imide, ether or ester and a second fuel permeation barrier layer disposed between said inner layer and said outer layer and being made of a ethylene vinyl alcohol material.

13. A fuel permeation resistant fuel tank as set forth in claim 12 wherein said inner layer and said outer layer are made of a polyethylene material.

14. A fuel permeation resistant fuel tank as set forth in claim 13 wherein said polyethylene material is a high density polyethylene.

15. A fuel permeation resistant fuel tank as set forth in claim 12 including a regrind layer disposed between said inner layer and said outer layer and being made of a regrind material.

16. A fuel permeation resistant fuel tank as set forth in claim 15 including a first adhesive layer disposed between said regrind layer and said inner layer and said outer layer.

17. A fuel permeation resistant fuel tank as set forth in claim 16 wherein said first adhesive layer is disposed between said first fuel permeation barrier layer and said inner layer.

18. A fuel permeation resistant fuel tank as set forth in claim 17 including a second adhesive layer disposed between said regrind layer and said first fuel permeation barrier layer.

19. A fuel permeation resistant fuel tank as set forth in claim 12 wherein said inner layer and said outer layer have a thickness greater than said first fuel permeation barrier layer.

20. A fuel tank comprising:

a tank shell having a wall formed from a plurality of layers;

said layers comprising at least an inner layer and an outer layer comprising a polyethylene material; and a first fuel permeation barrier layer comprising a liquid crystalline polymer material disposed between said outer layer and said inner layer, wherein said inner layer and said outer layer have a thickness greater than said first fuel permeation barrier layer, and a second fuel permeation barrier layer disposed between said inner layer and said outer layer and being made of a ethylene vinyl alcohol material.

21. A fuel permeation barrier fuel tank for a vehicle comprising:

a tank shell having a wall formed from a plurality of layers;

said layers comprising at least an inner layer and an outer layer; and a first fuel permeation barrier layer disposed between said inner layer and said outer layer and being made of a liquid crystalline polymer material and a second fuel permeation barrier layer disposed between said inner layer and said outer layer and being made of a ethylene vinyl alcohol material.

22. A high pressure container for storing gaseous fuel comprising:

a tank shell having a wall formed from a plurality of layers;

said layers comprising at least an inner layer, an outer layer, a first fuel permeation barrier layer disposed between said inner layer and said outer layer and being made of a liquid crystalline polymer material, and a second fuel permeation barrier layer disposed between said inner layer and said outer layer and being made of a ethylene vinyl alcohol material.

* * * * *